Patented Aug. 10, 1937

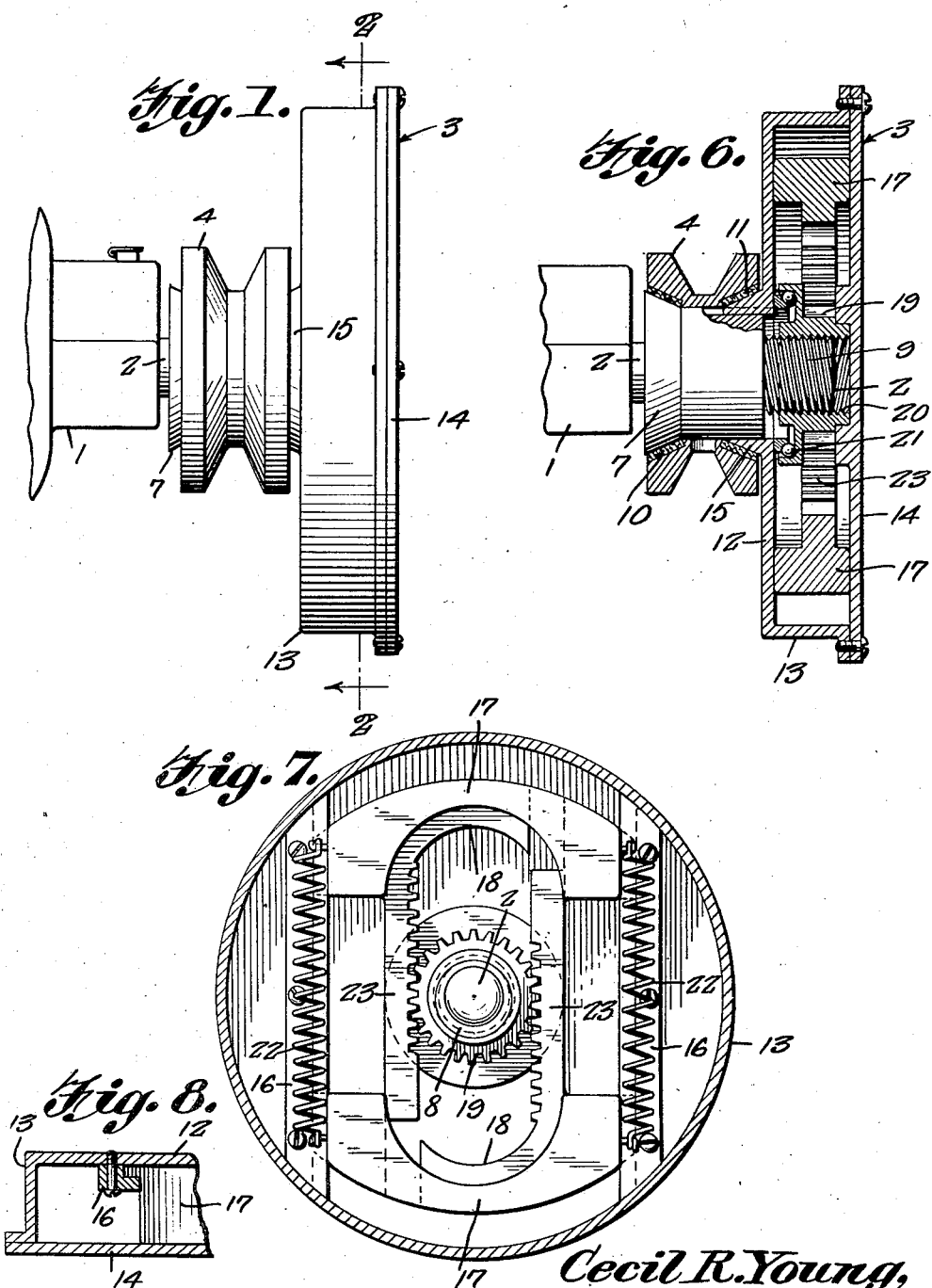

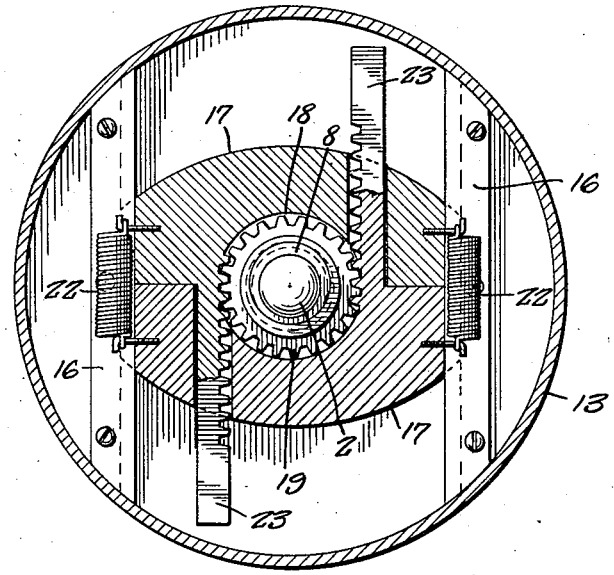
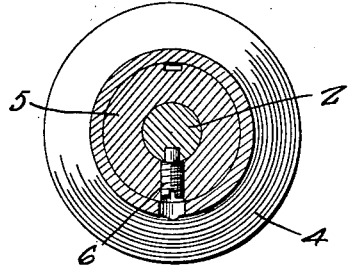
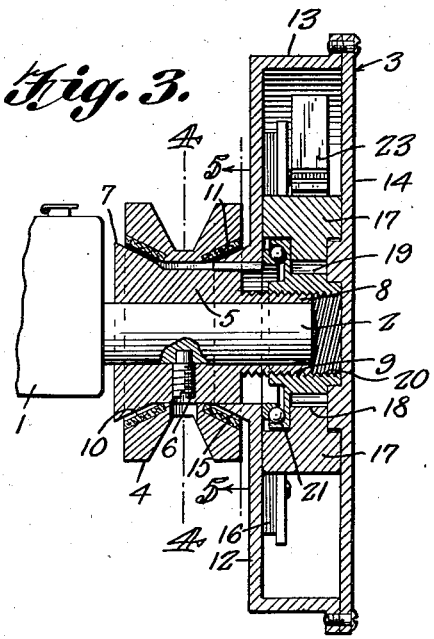
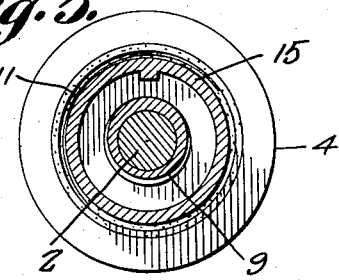

2,089,870

UNITED STATES PATENT OFFICE 2,089,870

AUTOMATIC CLUTCH

Cecil R. Young, Aberdeen, S. Dak.

Application January 26, 1937, Serial No. 122,451

4 Claims. (Cl. 192—105)

This invention relates to automatic clutches especially adapted for power takeoff devices for electric motors and similar power forces and has for the primary object the provision of a device of this character which will automatically disconnect the power source from the load when the speed of the power source is decreased beyond a predetermined amount by increasing of the load thereon to prevent stalling of the power source or the slowing down thereof to such extent which would be injurious thereto.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating an automatic clutch constructed in accordance with my invention and showing the same adapted to a fragmentary portion of a power source.

Figure 2 is a sectional view taken on the line 2—2 of Figure 1.

Figure 3 is a vertical sectional view showing the connection of the clutch with the power source.

Figure 4 is a sectional view taken on the line 4—4 of Figure 3.

Figure 5 is a sectional view taken on the line 5—5 of Figure 3.

Figure 6 is a vertical sectional view illustrating the clutch elements of the clutch engaged to establish a drive between the power source and a pulley adapted for connection to a load.

Figure 7 is a vertical sectional view showing the weights extended as occurs when the device is in clutching position.

Figure 8 is a fragmentary detail sectional view showing means of slidably supporting the weights of the clutch.

Referring in detail to the drawings, the numeral 1 indicates a fragmentary portion of a power source, the power shaft of which is indicated by the numeral 2 and has mounted thereon an automatic clutch 3 forming the subject matter of the present invention and which includes a pulley 4 for connecting the power source to a load.

A collar 5 is removably secured to the power shaft 2 by a set bolt 6 and a portion of the collar is shaped to form a clutch face or element 7 and another portion of the collar 5 is reduced to form an extension 8 having feed threads 9 thereon. The collar 5 extends through the opening in the pulley and the latter has clutch faces 10 and 11, the clutch face 10 being disposed adjacent the clutch face 7 of the collar. A disc 12 forming a part of a housing 13 is splined on the collar 5 with the extension 8 of the latter extending into the housing. The housing has a removable end wall 14. Formed on the wall 12 of the housing is a clutch element 15 to cooperate with the clutch face 11 of the pulley 4. A suitable lining may be secured to the clutch faces 10 and 11.

Guides 16 are arranged in the housing and slidably support weights 17 each having a recess 18. The recesses 18 cooperate in forming an opening to receive a gear 19. The hub of the gear 19 has feed threads 20 which mesh with the feed threads 9 of the extension 8. A thrust bearing 21 is arranged between the hub of the gear and the wall 12 of the housing. The weights 17 are urged in the direction of each other by coil springs 22 and the weights have formed thereon rack bars 23 which mesh with the gear 19. The weights move apart by centrifugal force and as said force decreases they are moved in the direction of each other by the spring. Consequently, it will be seen that the weights impart rotation to the gear in opposite directions and the latter being threaded to the extension 8 will move the housing towards and from the pulley 4. The weights 17 have openings therethrough to slidably receive the rack bars and the rack bars being slidable in said openings cooperate with the guides 16 in slidably supporting the weights.

The strength of the springs 22 is sufficient to offset a certain amount of centrifugal action keeping the weights together, as shown in Figure 2, and when in this position the clutch element 15 is moved away from the clutch element 7, freeing the pulley 4 from the collar 5. However, when the centrifugal force overcomes the action of the springs, the weights 17 move apart rotating the gear 19 and the rotation of the latter moves the housing or the clutch element 15 carried thereby in the direction of the clutch element 7. The clutch element 15 moving towards the clutch element 7 shifts the pulley 4 on the collar 5 so that the clutch faces 10 and 11 thereof become frictionally engaged with the clutch elements 7 and 15, thereby establishing a drive between the collar 5 and the pulley 4.

While the element 4 has been referred to as a pulley it is to be understood that this element can be in the form of a sprocket or a gear.

Having described the invention, I claim:

1. An automatic clutch comprising a collar secured to a power source, a clutch element formed on said collar, a housing splined to said collar, a clutch element formed on said housing and arranged opposite the first-named clutch element, a pulley mounted on the collar and having clutch faces arranged opposite the clutch elements, a gear threaded to the collar, a thrust bearing between the gear and the housing, centrifugally actuated weights mounted in said housing, and means connecting said weights to the gear.

2. An automatic clutch comprising a collar secured to a power source, a clutch element formed on said collar, a housing splined to said collar, a clutch element formed on said housing and arranged opposite the first-named clutch element, a pulley mounted on the collar and having clutch faces arranged opposite the clutch elements, a gear threaded to the collar, a thrust bearing between the gear and the housing, weights slidably mounted in said housing, springs connecting said weights, and means connecting said weights to the gear.

3. An automatic clutch comprising a collar secured to a power source, a clutch element formed on said collar, a housing splined to said collar, a clutch element formed on said housing and arranged opposite the first-named clutch element, a pulley mounted on the collar and having clutch faces arranged opposite the clutch elements, a gear threaded to the collar, a thrust bearing between the gear and the housing, weights slidably mounted in said housing, springs connecting said weights, and rack bars formed on said weights and meshing with the gear.

4. An automatic clutch comprising a collar secured to a power source, a clutch element formed on said collar, a housing splined to said collar, a clutch element formed on said housing and arranged opposite the first-named clutch element, a pulley mounted on the collar and having clutch faces arranged opposite the clutch elements, a gear threaded to the collar, a thrust bearing between the gear and the housing, weights slidably mounted in said housing, springs connecting said weights, rack bars formed on said weights and meshing with the gear, said weights having openings to slidably receive the rack bars.

CECIL R. YOUNG.